United States Patent
Cheng

(10) Patent No.: US 6,398,171 B1
(45) Date of Patent: Jun. 4, 2002

(54) WRIST REST COVER OF PORTABLE COMPUTER

(75) Inventor: Chia-Shyong Cheng, Taipei (TW)

(73) Assignee: First International Computer, Inc., Taipei (TW)

( * ) Notice: Subject to any disclaimer, the term of this patent is extended or adjusted under 35 U.S.C. 154(b) by 0 days.

(21) Appl. No.: 09/708,012

(22) Filed: Nov. 8, 2000

(30) Foreign Application Priority Data

Apr. 19, 2000 (TW) ..................................... 89206412 U

(51) Int. Cl.[7] .............................. B68G 5/00; G06F 1/16
(52) U.S. Cl. ...................... 248/118; 248/918; 361/680; 361/683; 708/141; 400/715
(58) Field of Search ........................... 248/118, 118.1, 248/918; 361/680, 683; 708/141; 400/714, 715

(56) References Cited

U.S. PATENT DOCUMENTS

| | | | | |
|---|---|---|---|---|
| 4,671,688 A | * | 6/1987 | Brashears | 400/714 |
| 5,383,643 A | * | 1/1995 | Koch | 248/447 |
| 5,443,320 A | * | 8/1995 | Agata et al. | 400/715 |
| 5,546,334 A | * | 8/1996 | Hsieh et al. | 708/141 |
| 5,547,154 A | * | 8/1996 | Kirchhoff et al. | 248/118.3 |
| 5,551,497 A | * | 9/1996 | Stanley | 150/154 |
| 5,570,268 A | * | 10/1996 | Selker | 361/683 |
| 5,596,481 A | * | 1/1997 | Liu et al. | 361/683 |
| 5,764,474 A | * | 6/1998 | Youens | 361/680 |
| 5,835,344 A | * | 11/1998 | Alexander | 361/683 |
| 5,971,332 A | * | 10/1999 | Sun et al. | 248/118 |
| 6,025,986 A | * | 2/2000 | Sternglass et al. | 361/680 |
| 6,040,977 A | * | 3/2000 | Hoffer | 361/680 |
| 6,089,516 A | * | 7/2000 | Yates | 248/118 |
| 6,095,702 A | * | 8/2000 | Garbacik | 400/496 |
| 6,175,488 B1 | * | 1/2001 | Seto et al. | 361/683 |
| 6,195,255 B1 | * | 2/2001 | Kim | 361/683 |
| 6,216,988 B1 | * | 4/2001 | Hsu et al. | 248/118 |
| 6,237,879 B1 | * | 5/2001 | Budge | 248/118 |
| 6,262,716 B1 | * | 7/2001 | Raasch | 345/168 |

* cited by examiner

*Primary Examiner*—Anita King
(74) *Attorney, Agent, or Firm*—Rabin & Berdo, P.C.

(57) ABSTRACT

A wrist rest cover of a portable computer, wherein the size of the wrist rest cover is approximately equal to the size of a wrist rest. The wrist rest cove has an opening for exposing the glidepad and buttons of the portable computer. The wrist rest cover can be made to be comfortable and with a soft texture, and is fit for laying wrists thereon or made of transparent material. Besides, the wrist rest cover is designed in compliance with the human factors. The pictures, personal information or the like can be placed between the wrist rest cover and the portable computer. The transparent wrist rest cover can also be etched with various patterns on the interior side of the wrist rest cover.

13 Claims, 2 Drawing Sheets

WRIST REST COVER OF PORTABLE COMPUTER

BACKGROUND OF THE INVENTION

This application incorporates by reference Taiwanese application Serial No. 89206412, Filed on Apr. 19th, 2000.

1. Field of the Invention

The invention relates in general to a portable computer, and more particularly to a wrist rest cover of a portable computer.

2. Description of the Related Art

As the electronic products with light, thin, short and small caters to the demand of consumers, portable computers, have been widely used and become crucial tools in just about every field nowadays due to its portability, simplicity, and size. However, using the portable computer for a long time might cause users computing discomfort and wrist injury.

In addition, the appearance of the traditional portable computer, being dark-colored or gray-colored, is hard to identify and lacks personal distinguishing characteristics.

SUMMARY OF THE INVENTION

It is therefore an object of the invention to provide a wrist rest cover of a portable computer capable of solving the wrist discomfort problem and adding individual design characteristics for distinguishing the computer from others.

The invention achieves the above-identified objects by providing a wrist rest cover of a portable computer. The portable computer concludes a glidepad and buttons. Besides, the size of the wrist rest cover is approximately equal to the size of a wrist rest. The wrist rest cover, having an opening for exposing the glidepad and buttons, can be mounted on the wrist rest.

The wrist rest cover is made of comfortable and soft texture materials, and is fit to receive wrists laying thereon or is made of transparent material. And the wrist rest cover is designed in compliance with the human factors. The pictures, personal information or the like can be placed between the wrist rest cover and the portable computer.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
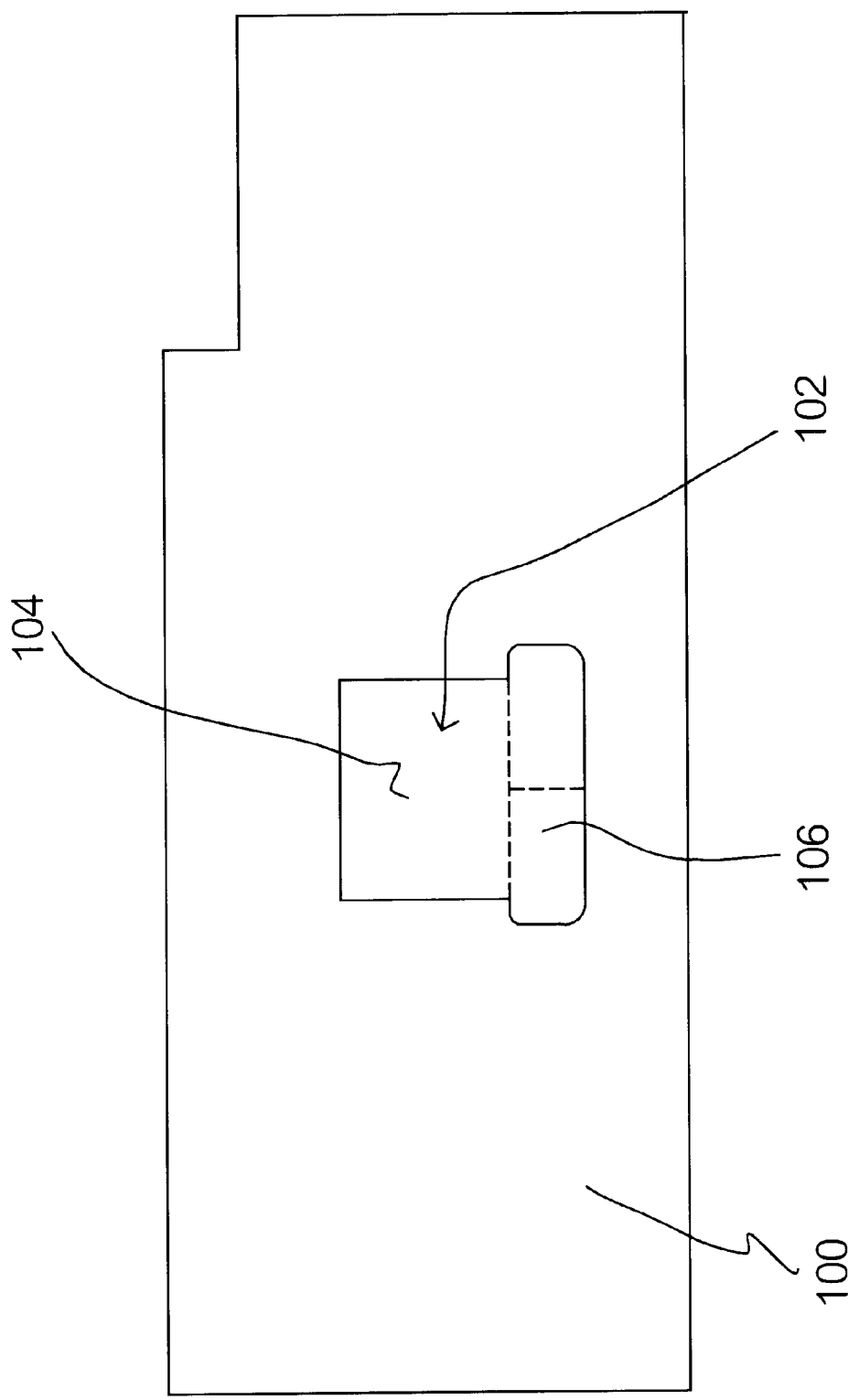
FIG. 1 shows an upper view of a wrist rest cove of a portable computer according to a preferred embodiment of the invention.
Figure 2:
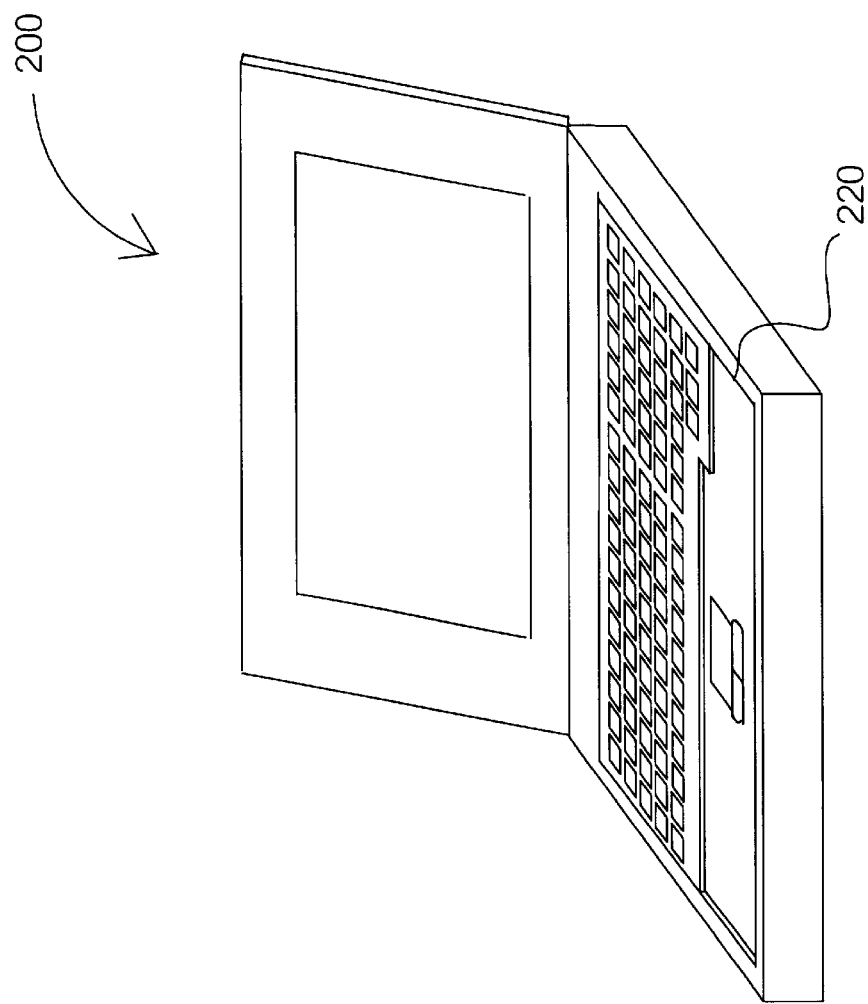
FIG. 2 shows a cover of a wrist rest cover of a portable computer applied to a portable computer according to a preferred embodiment of the invention.

Referring first to FIG. 1, an upper view of a wrist rest cover of a portable computer according to a preferred embodiment of the invention is shown. The size of the wrist rest cover 100 is approximately equal to or smaller than the size of the wrist rest of the traditional portable computer. Referring to FIG. 2, the wrist rest cover 100 mounted on the wrist rest 220 can secure or lock the wrist rest 220.

The opening 102 near the center of the wrist rest cover 100 enables the the glidepad 104 and buttons 106 to be exposed. The wrist rest cover 100 is made of comfortable and soft texture materials, such as leather, artificial leather, sponge, foam sponge, rubber and so forth and is fit for laying wrists thereon. Besides, the wrist rest cover 100 is designed in compliance with human factors and facilitates users' stress-free use.

Furthermore, the wrist rest cover 100 can also be made of transparent material for various etched patterns on the interior side of the wrist rest cover 100 or capable of reserving photographs, pictures, personal information, memorandums or address books between the portable computer 200 and the wrist rest cover 100. Hence, the appearance of the portable computer 200 can possess personal distinguishing characteristics and practicability.

The wrist rest cover 100 of the portable computer 200, moreover, makes the single wrist rest 220 doubled and thus has a strengthened structure.

The wrist rest cover of a portable computer according to a preferred embodiment of the invention has the following features:

1. The wrist rest cover is designed in compliance with the human factors and facilitates a user's stress-free use.
2. The appearance of the portable computer possesses personal distinguishing characteristics and practicability.
3. The wrist rest cover of the portable computer makes the single wrist rest doubled and thus has a strengthened structure.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wrist rest cover for a portable computer, wherein the portable computer comprises a glidepad and the size of the wrist rest cover is substantially equal to the size of a wrist rest, the wrist rest cover comprising:

an opening for exposing at least the glidepad when the wrist rest cover is mounted on the computer's wrist rest.

2. The wrist rest cover of a portable computer according to claim 1, wherein the portable computer further comprises a button and the opening of the wrist rest cover exposes at least the glidepad and the button.

3. The wrist rest cover of a portable computer according to claim 1, wherein the wrist rest cover secures the wrist rest of the portable computer.

4. The wrist rest cover of a portable computer according to claim 1, wherein the wrist rest cover locks the wrist rest of the portable computer.

5. The wrist rest cover of a portable computer according to claim 1, wherein the wrist rest cover has comfortable, soft texture, and is fit for laying wrists thereon.

6. The wrist rest cover of a portable computer according to claim 5, wherein the wrist rest cover is made of leather, artificial leather, sponge, bubble sponge or rubber.

7. The wrist rest cover of a portable computer according to claim 1, wherein the wrist rest cover is designed in compliance with the human factors.

8. The wrist rest cover of a portable computer according to claim 1, wherein the wrist rest cover is made of transparent material.

9. The wrist rest cover of a portable computer according to claim 8, wherein a picture can be placed between the wrist rest cover and the portable computer.

10. The wrist rest cover of a portable computer according to claim 8, wherein personal information can be placed between the wrist rest cover and the portable computer.

11. The wrist rest cover of a portable computer according to claim 8, wherein a memorandum can be placed between the wrist rest cover and the portable computer.

12. The wrist rest cover of a portable computer according to claim 8, wherein an address book can be placed between the wrist rest cover and the portable computer.

13. The wrist rest cover of a portable computer according to claim 8, wherein the interior side of the wrist rest cover is capable of being etched with various patterns.

* * * * *